united States Patent Office  3,326,902
Patented June 20, 1967

3,326,902
19-NOR DERIVATIVES OF 16,17-DIHYDROXY-
PROGESTERONE
Patrick Andrew Diassi, Westfield, N.J., assignor, by mesne
assignments, to E. R. Squibb & Sons, Inc., New York,
N.Y., a corporation of Delaware
No Drawing. Filed Mar. 11, 1965, Ser. No. 439,065
3 Claims. (Cl. 260—239.55)

This application is a continuation-in-part of a previous application, Serial No. 318,503, filed Oct. 24, 1963, and issued as U.S. Patent 3,228,931 on Jan. 11, 1966.

This invention relates to and has for its objects the provision of new physiologically active compounds, novel processes for their production and new intermediates useful in the preparation thereof.

More particularly, this invention relates to compounds of the formula

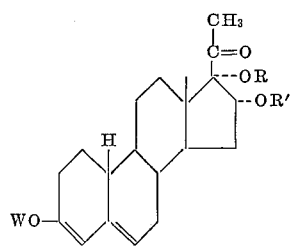

wherein W is lower alkyl; R is hydrogen; R' is hydrogen and taken together R and R' is

wherein P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower akyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets. Moreover, it has surprisingly been found that the compounds of this invention are many times more active than are the corresponding 19-methylated derivatives.

The compounds of this invention can be prepared by employing the novel processes of this invention beginning with compounds of the formula

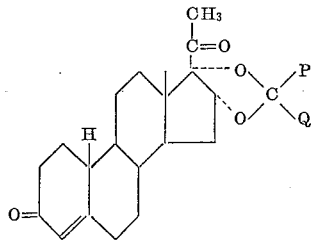

wherein P and Q are as hereinbefore defined, as starting material. The starting material of this invention may be prepared in accordance with the procedures set forth in copending application, Ser. No. 129,234, filed Aug. 4, 1961, in the names of Josef Fried and Mariano Guiducci, and issued as U.S. Patent 3,243,433, on Mar. 29, 1966.

The compounds of this invention may be prepared according to the process of this invention which may be represented by the following equations wherein R, R', P, and Q are as hereinbefore defined; and Z is lower alkyl:

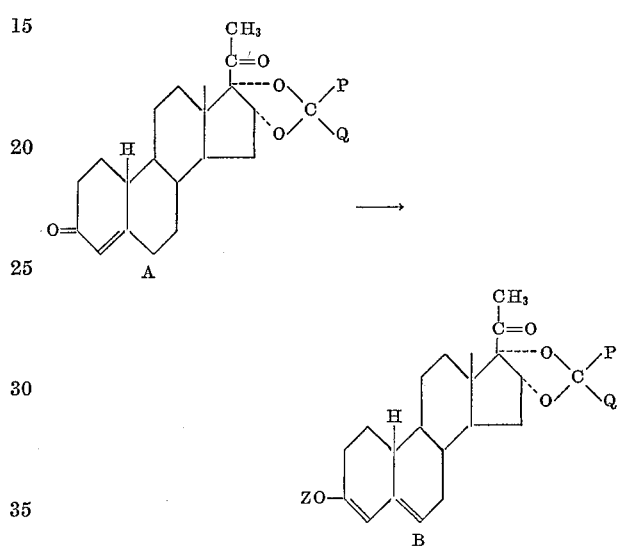

I Z=C₂H₅; P=Q=CH₃
II Z=C₂H₅; Q=C₆H₅; P=CH₃

In the first step of the process of this invention, the 16,17-acetal and ketal derivatives of 16,17-dihydroxy 19-norprogesterone are alkylated, as by treatment with an alkyl orthoformate, for example, ethyl orthoformate to yield the 16,17-acetal and ketal derivatives of 3-alkoxy-19-nor-Δ³,⁵-pregnadiene-20-one (Compounds A'), which are new compounds of this invention.

To obtain any desired 16,17-ketal or acetal derivative of this invention, Compounds B may then be treated with an aldehyde or ketone of the formula

wherein P and Q are as hereinbefore defined. The reaction is preferably carried out by treating a suspension or solution of the dihydroxy steroid in the aldehyde or ketone (or an organic solvent and the aldehyde or ketone, if the adehydes or ketone is a solid) with an acid catalyst (e.g., perchloric acid, p-toluenesulfonic acid, hydrochloric acid, and so forth), neutralizing the acid and recovering the acetal or ketal derivative formed.

Suitable aldehyde and ketone reactants include lower alkanals of at least two carbon atoms, such as paraldehyde, propanal and hexanal; di(lower alkyl)-ketones, such as acetone, diethylketone, dibutylketone, methylethylketone, and methylisobutylketone; cycloalkanones, such as cyclobutanone, cyclopentanone, cyclohexanone, suberone, and cyclodexanone; cycloalkyl (lower alkanals), such as cyclopropylcarboxaldehyde,
cyclobutylcarboxaldehyde,
cyclopentylcarboxaldehyde,
cyclohexylcarboxaldehyde,
cycloheptylcarboxaldehyde,
cyclooctylcarboxaldehyde,
cyclopropylacetaldehyde,
cyclobutylacetaldehyde,
cyclopentylacetaldehyde,
cyclohexylacetaldehyde,
β-cyclopentylpropionaldehyde,
γ-cyclohexylbutyraldehyde, and
3-cyclopropylcaproaldehyde;
cycloalkyl(lower alkanones), such as cyclopropylmethyl ketone, cyclobutyl ethyl ketone, cyclopentyl propyl ketone, cyclopentylmethyl methyl ketone, cyclohexylmethyl ethyl ketone, cyclopentylethyl ethyl ketone, cyclopropylpropyl methyl ketone, cyclohexyl n-pentyl ketone, cyclohexyl methyl ketone, and cyclooctyl methyl ketone; dicycloalkyl ketones, such as dicyclopropyl ketone, dicyclobutyl ketone, dicyclopentyl ketone, dicyclohexyl ketone, cyclopentyl cyclohexyl ketone, cyclopropylmethyl cyclopropyl ketone, 2-cyclobutylethyl cyclopropyl ketone, 3-cyclopentylmethyl cyclopentyl ketone, 5-cyclohexylhexyl cyclohexyl ketone, di(cyclopentylmethyl) ketone, cyclohexylmethyl cyclopentyl ketone, and di(4-cyclohexylpentyl) ketone; cycloalkylmonocyclic aromatic ketones, such as cyclopropyl phenyl ketone, cyclohexyl p-chlorophenyl ketone, cyclopentyl o-methoxyphenyl ketone, cyclopentyl o,p-dihydroxyphenyl ketone, cyclohexyl m-tolyl ketone, cyclopropyl p-ethylphenyl ketone cyclopropyl p-nitrophenyl ketone, and cyclohexyl p-acetamidophenyl ketone; cycloalkyl(lower alkyl) monocyclic aromatic ketones, such as cyclopentylmethyl phenyl ketone; cycloalkyl monocyclic aromatic (lower alkyl) ketones, such as cyclopentyl benzyl ketone, cyclohexyl phenethyl ketone, and cyclobutyl benzyl ketone; cycloalkyl(lower alkyl) monocyclic aromatic (lower alkyl) ketones, such as cyclopentylmethyl benzyl ketones; cycloalkyl monocyclic heterocyclic ketones, such as cyclopentyl 2-furyl ketone, cyclohexyl 2-thienyl ketone, and cyclopropyl 2-pyridinyl ketone; cycloalkyl (lower alkyl) monocyclic heterocyclic ketones, such as cyclopentylmethyl 2-piperidinyl ketone, cyclohexylethyl 2-morpholinyl ketone and cyclopropyl 2-thienyl ketone; cycloalkyl monocyclic heterocyclic (lower alkyl) ketones, such as cyclopentyl thenyl ketone, cyclohexyl furfuryl ketone and cyclopropyl 2-piperidinylmethyl ketone; halo-lower alkanals, such as chloral hydrate, trifluoroacetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g. p-chlorobenzaldehyde and p-fluorobenzaldehyde), lower alkoxybenzaldehydes (e.g., o-anisaldehyde), di(lower alkoxy) benzaldehydes (e.g., veratraldehyde), hydroxybenzaldehydes (e.g. salicylaldehyde), dihydroxybenzaldehydes (e.g. resorcyaldehyde), lower alkyl benzaldehydes (e.g. m-tolualdehyde and p-ethylbenzaldehyde), di(lower alkyl) benzaldehydes (e.g. o,p-dimethylbenzaldehyde), nitrobenzaldehydes, acylamidobenzaldehydes (e.g. N-acetylanthranilaldehyde), and cyanobenzaldehydes; monocyclic carboxylic aromatic lower alkanals, such as phenylacetaldehyde, α-phenylpropionaldehyde, β-phenylpropionaldehyde, γ-phenylbutyraldehyde, and aromatically-substituted halo lower alkoxy, hydroxy, lower alkyl, nitro, acylamido and cyano derivatives thereof; monocyclic heterocyclic aldehydes, such as picolinaldehydes, furfural, thiophene carbonals, and halo, lower alkoxy, hydroxy, lower alkyl, nitro, and cyano derivatives thereof; monocyclic heterocyclic lower alkanals; monocyclic carbocyclic aromatic ketones, such as aceto- phenone, α,α,α-trifluoroacetophenone, propiophenone, butyrophenone, varlerophenone, isocaprophenone, halophenyl lower alkyl ketones (e.g. p-chloroacetophenone and p-chloropropiophenone), (lower alkoxy) phenyl lower alkyl ketones (e.g. p-anisyl methyl ketone), di(lower alkoxy)phenyl lower alkyl ketones, hydroxy-phenyl lower alkyl ketones, dihydroxyphenyl lower alkyl ketones (e.g. resacetophenone), (lower alkyl) phenyl lower alkyl ketones (e.g. methyl p-tolyl ketone), di(lower alkyl)phenyl lower alkyl ketones (o,p-xylyl methyl ketone), nitrophenyl lower alkyl ketones (e.g. p-nitroacetophenone), acylamidophenyl lower alkyl ketones (e.g. acetyl anilines), and cyanophenyl lower alkyl ketones; benzophenone, and mono or bis substituted halo, lower alkoxy, hydroxy, lower alkyl, nitro, acylamido and cyano derivatives thereof; monocyclic carbocyclic aromatic lower alkanones, such as 1-phenyl-3-butanone and 1-phenyl-4-pentanone, and aromatically substituted derivatives thereof; monocyclic heterocyclic ketones, such as 2-acetylfuran, 2-benzoylfuran, 2-acetyl-thiophene and alloxan; and monocyclic heterocyclic lower alkanones.

The following examples are illustrative of the invention (all temperatures being in degrees centigrade unless specifically noted.)

*Example 1.—3-ethoxy-16α,17α-dimethylmethylenedioxy-19-nor-Δ³,⁵-pregnadiene-20-one*

To a suspension of 5 gm. of 16α,17α-dimethylmethylenedioxy-19-nor-progesterone in a mixture of 38 ml. of dioxane, 0.5 ml. of absolute ethanol and 5 ml. of ethyl orthoformate, 3.5 ml. of a dioxane solution containing 0.18 ml. of sulfuric acid are added. The mixture is stirred for twenty minutes at room temperature then 2 ml. of pyridine are added and the mixture diluted with 30 ml. of water. The precipitate which separates is filtered, washed with methanol-water (1:1) and dried to give 3-ethoxy-16α,17α - dimethylmethylenedioxy-19 - nor-Δ³,⁵-pregnadiene-20-one.

*Example 2.—3-ethoxy-16α,17α-(β-methyl-α-phenylmethylenedioxy)-19-nor-Δ³,⁵-pregnadiene-20-one*

Following the procedure of Example 1 but substituting 16α,17α - (β-methyl-α-phenylmethylenedioxy) - 19 - norprogesterone for 16α,17α-dimethylmethylenedioxy-19-nor-progesterone there is obtained 3-ethoxy-16α,17α-(β-methyl-α-phenylmethylene-dioxy) - 19-nor - Δ³,⁵-pregnadiene-20-one.

The invention may be variously otherwise embodied within the scope of the appended claims.

What is claimed is:
1. A compounds of the formula

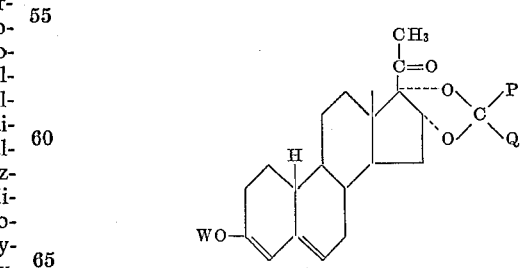

wherein W is lower alkyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group consisting of monocyclic cycloalkyl and monocyclic heterocyclic.

2. 3-ethoxy-16α,17α-dimethylmethylenedioxy - 19-nor-$\Delta^{3,5}$-pregnadiene-20-one.

3. 3-ethoxy-16α,17α - (β-methyl-α-phenylmethylenedioxy)-19-nor-$\Delta^{3,5}$-pregnadiene-20-one.

References Cited

UNITED STATES PATENTS

| | | | |
|---|---|---|---|
| 3,095,411 | 6/1963 | Kirk et al. | 260—239.55 |
| 3,123,601 | 3/1964 | Diassi | 260—239.55 |
| 3,213,087 | 10/1965 | Bowers et al. | 260—239.55 |

LEWIS GOTTS, *Primary Examiner.*

ELBERT L. ROBERTS, *Examiner.*

THOMAS M. MESHBESHER, *Assistant Examiner.*